US012125295B2

(12) United States Patent
Yorifuji

(10) Patent No.: US 12,125,295 B2
(45) Date of Patent: Oct. 22, 2024

(54) ROAD SURFACE MARKING DETECTION DEVICE, NOTIFICATION SYSTEM PROVIDED WITH THE SAME, AND ROAD SURFACE MARKING DETECTION METHOD

(71) Applicant: TOYOTA JIDOSHA KABUSHIKI KAISHA, Toyota (JP)

(72) Inventor: Yamato Yorifuji, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 17/983,440

(22) Filed: Nov. 9, 2022

(65) Prior Publication Data

US 2023/0222813 A1   Jul. 13, 2023

(30) Foreign Application Priority Data

Jan. 11, 2022  (JP) ................. 2022-002396

(51) Int. Cl.
  *G06V 20/56*   (2022.01)
  *B60W 40/08*   (2012.01)
  *B60W 50/14*   (2020.01)

(52) U.S. Cl.
  CPC .......... *G06V 20/588* (2022.01); *B60W 40/08* (2013.01); *B60W 50/14* (2013.01); *B60W 2050/143* (2013.01); *B60W 2050/146* (2013.01); *B60W 2420/403* (2013.01); *B60W 2540/225* (2020.02); *B60W 2554/80* (2020.02)

(58) Field of Classification Search
  CPC .... G06V 20/588; B60W 40/08; B60W 50/14; B60W 2050/143; B60W 2050/146; B60W 2420/403; B60W 2540/225; B60W 2554/80
  See application file for complete search history.

(56) References Cited

U.S. PATENT DOCUMENTS

| 10,726,576 B2 * | 7/2020 | Noble ................. G06V 40/161 |
| 2011/0135155 A1 | 6/2011 | Kudo |
| 2018/0005529 A1 * | 1/2018 | Edelstein .............. H04N 7/181 |
| 2020/0112657 A1 * | 4/2020 | Stein ........................ B60R 1/00 |
| 2022/0355815 A1 * | 11/2022 | Bill-Clark ........... G06V 40/103 |
| 2023/0075493 A1 * | 3/2023 | Kabkab ................ G06V 20/582 |

FOREIGN PATENT DOCUMENTS

| JP | 2006-260038 A |   | 9/2006 |   |
| JP | 2007257305 A | * | 10/2007 |   |
| JP | 2011-123613 A |   | 6/2011 |   |
| JP | 4820712 B2 | * | 11/2011 | ............ G01C 21/26 |
| JP | 2019-008443 A |   | 1/2019 |   |
| JP | 7495179 B2 | * | 6/2024 | ........... B60W 10/04 |

\* cited by examiner

*Primary Examiner* — Adnan Aziz
*Assistant Examiner* — James E Munion
(74) *Attorney, Agent, or Firm* — Dinsmore & Shohl LLP

(57) ABSTRACT

A road surface marking detection device is applied to a vehicle that includes a first camera that captures an image of at least an area forward of the vehicle, and a second camera that captures an image of at least an area forward of the vehicle and is able to capture a road surface region closer to the vehicle than a road surface region of which the image captured by the first camera. The road surface marking detection device includes a processor that, when a temporary stop sign forward of the vehicle is detected by the first camera, executes a process of detecting a road surface marking corresponding to the detected temporary stop sign by the second camera.

4 Claims, 5 Drawing Sheets

ROAD SURFACE MARKING DETECTION DEVICE, NOTIFICATION SYSTEM PROVIDED WITH THE SAME, AND ROAD SURFACE MARKING DETECTION METHOD

CROSS-REFERENCE TO RELATED APPLICATION

This application claims priority to Japanese Patent Application No. 2022-002396 filed on Jan. 11, 2022, incorporated herein by reference in its entirety.

BACKGROUND

1. Technical Field

The present disclosure relates to a road surface marking detection device applied to a vehicle, a notification system provided with the same, and a road surface marking detection method.

2. Description of Related Art

Japanese Unexamined Patent Application Publication No. 2007-257305 (JP 2007-257305 A) discloses a vehicle exterior recognition device. This vehicle exterior recognition device calculates a distance between a vehicle and a stop line in front of the vehicle and a distance between a vehicle and a temporary stop sign based on an image captured by a camera. In order to improve the reliability of a distance detection result, the vehicle exterior recognition device determines whether the other calculated distance is appropriate based on one calculated distance.

SUMMARY

The technique described in JP 2007-257305 A has the following problems when detecting a stop line corresponding to a temporary stop sign using a camera. That is, when there is a preceding vehicle in front of an own vehicle, the stop line may be blocked by the preceding vehicle at a timing when the stop line falls within the angle of view of the camera, and the stop line may not be detected by the camera. After that, when the own vehicle further approaches the stop line, the stop line may be out of the angle of view of the camera even though the stop line is no longer blocked by the preceding vehicle. As a result, there is a possibility that the stop line can not be detected by the camera.

The present disclosure has been made in view of the problems described above, and an object of the present disclosure is to reliably detect a road surface marking even when the preceding vehicle is present when the vehicle (own vehicle) approaches the road surface marking such as the stop line.

A road surface marking detection device according to the present disclosure is applied to a vehicle including: a first camera that captures an image of at least an area forward of the vehicle; and a second camera that captures an image of at least an area forward of the vehicle and that is able to capture an image of a road surface region closer to the vehicle than a road surface region of which the image captured by the first camera, in which the road surface marking detection device includes a processor that, when a temporary stop sign forward of the vehicle is detected by the first camera, executes a process of detecting a road surface marking corresponding to the detected temporary stop sign by the second camera.

A notification system according to an aspect of the present disclosure includes the road surface marking detection device described above, a notification device, and a processor. The notification device performs notification to alert a driver of the vehicle. The processor controls, when a distance between the detected road surface marking and the vehicle is equal to or less than a distance threshold and a vehicle speed of the vehicle is equal to or higher than a speed threshold, the notification device such that the notification device performs notification to alert the driver regarding temporary stop of the vehicle.

A notification system according to another aspect of the present disclosure includes the road surface marking detection device described above, a notification device, an inward facing camera, and a processor. The notification device performs notification to alert a driver of the vehicle. The inward facing camera is mounted inside the vehicle and captures an image of the driver. The processor controls the notification device such that the notification device performs notification to alert the driver regarding temporary stop of the vehicle, when the processor detects that the driver does not look ahead carefully based on an image of the inward facing camera after the road surface marking is detected.

A road surface marking detection method according to the present disclosure is applied to a vehicle including a first camera that captures an image of at least an area forward of the vehicle, and a second camera that captures an image of at least an area forward of the vehicle and is able to capture an image of a road surface region closer to the vehicle than a road surface region of which the image captured by the first camera. The road surface marking detection method includes detecting, when a temporary stop sign forward of the vehicle is detected by the first camera, a road surface marking corresponding to the detected temporary stop sign by the second camera.

The second camera can capture the image of the road surface region closer to the vehicle than the road surface region of which the image captured by the first camera. According to the present disclosure, even when a preceding vehicle is present when the vehicle (own vehicle) approaches the road surface marking such as a stop line, it is possible to reliably detect the road surface marking using the second camera when the own vehicle further approaches the road surface marking later.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the accompanying drawings. However, when the number, quantity, amount, range, etc. of each element are referred to in the embodiment shown below, the technical idea of the present disclosure is not limited to the numbers mentioned herein except when explicitly stated or when clearly specified by the number in principle.

1. Vehicle Configuration Example

Figure 1:
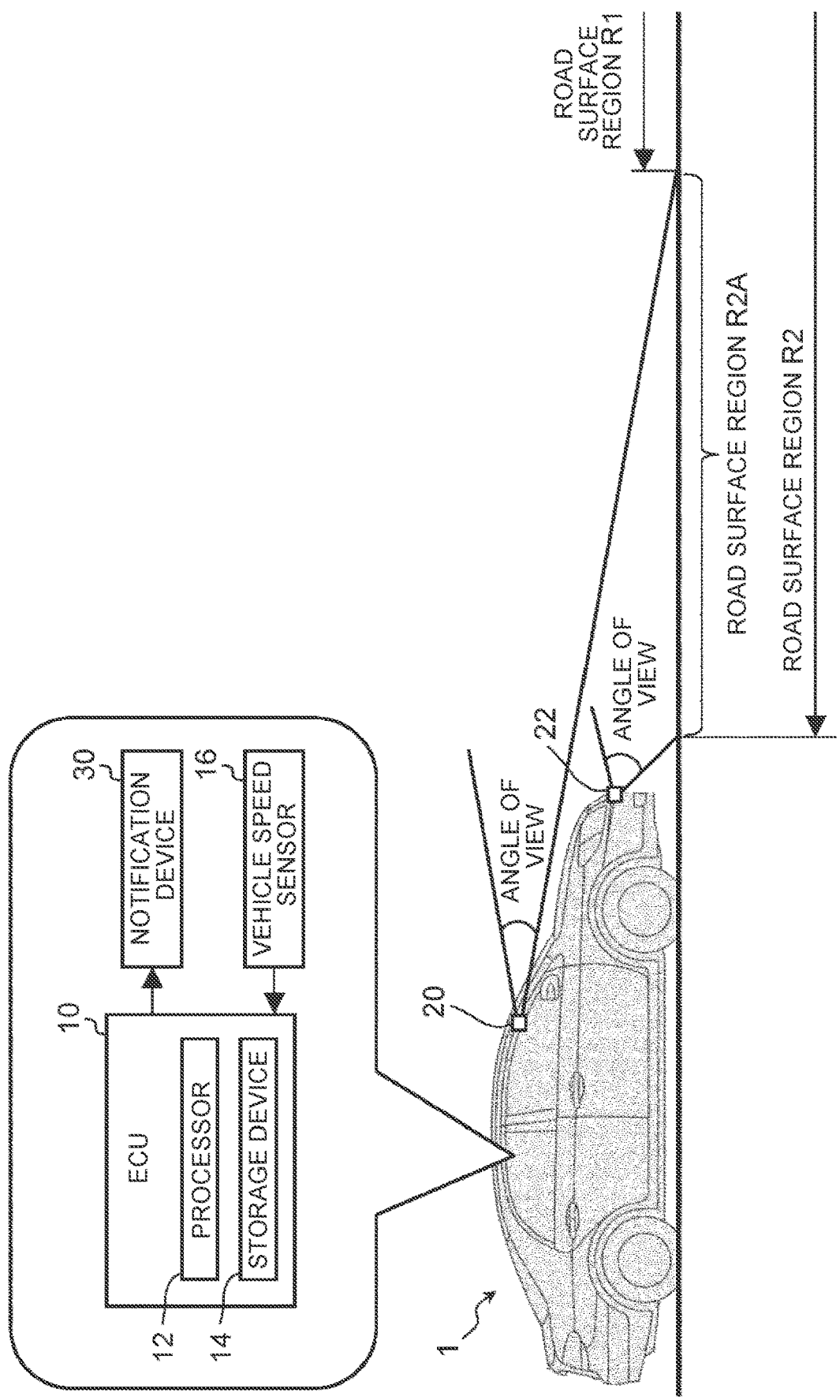
FIG. 1 is a diagram schematically showing an example of a configuration of a vehicle according to an embodiment.

FIG. 1 is a diagram schematically showing an example of a configuration of a vehicle 1 according to an embodiment. The vehicle 1 includes an electronic control unit (ECU) 10, a first camera 20, a second camera 22, and a notification device 30.

The ECU 10 is a computer that controls the vehicle 1. The ECU 10 includes one or more processors (hereinafter simply referred to as a processor) 12 and one or more storage devices (hereinafter simply referred to as a storage device) 14. The processor 12 executes various processes. For example, the processor 12 includes a central processing unit (CPU). The storage device 14 stores various kinds of information necessary for processing by the processor 12. Examples of the storage device 14 include a volatile memory, a non-volatile memory, a hard disk drive (HDD), and a solid state drive (SSD). The processor 12 executes various programs, so that various processes by the processor 12 are realized. The various programs are stored in the storage device 14. A plurality of the ECUs 10 may be provided.

The vehicle 1 also includes a vehicle speed sensor 16 that detects a vehicle speed V (a speed of the vehicle 1).

The first camera 20 and the second camera 22 each capture an image of an area forward of the vehicle 1. Each of the "first camera" and the "second camera" according to the present disclosure may capture the image of the at least area forward of the vehicle, and may also capture images of areas in other directions (for example, side areas) in addition to the area forward of the vehicle 1.

The first camera 20 is mounted, for example, on the vehicle 1 to recognize various targets such as road signs (for example, a temporary stop sign 4 shown in FIG. 2), vehicles forward of the vehicle 1 (a preceding vehicle, an oncoming vehicle, etc.), and pedestrians. The first camera 20 is installed, for example, in a vehicle cabin of the vehicle 1 (for example, on a back side of an inner mirror), and captures the image of the area forward of the vehicle 1 through a windshield. The "first camera" according to the present disclosure may be mounted on a roof of the vehicle 1, for example.

The second camera 22 is one of a plurality of cameras, for example. Each of the cameras is disposed on the front, the rear, the right, or the left of the vehicle 1 for the basic purpose of assisting the driver in confirming the surroundings of the vehicle 1 when the vehicle 1 travels at a low speed, such as when the driver parks and starts the vehicle. The second camera 22 is, for example, a wide-angle fisheye camera, and is installed on a front bumper. The "second camera" according to the present disclosure may be, for example, at least one of two cameras disposed on the right and left sides of the vehicle 1 (for example, the lower side of the door mirror for rearward confirmation) for the above purpose.

The second camera 22 is disposed below the first camera 20 in a vertical direction. In addition, the second camera 22 has an angle of view in which an image of the lower side than the image of the area captured by the first camera 20 can be captured. Therefore, as shown in FIG. 1, a road surface region R2 of which the image captured by the second camera 22 includes a road surface region R2A closer to the vehicle 1 than a road surface region R1 of which the image captured by the first camera 20.

The notification device 30 performs notification to alert the driver of the vehicle 1. The notification device 30 is, for example, a display for visually alerting the driver. The display is, for example, a display mounted on an instrument panel of the vehicle 1 or a head-up display (HUD) that displays information on the windshield of the vehicle 1. Further, the notification device 30 may include one or both of a buzzer and a speaker for aurally alerting the driver instead of or in addition to the display.

The notification device 30 is controlled by the ECU 10 (processor 12). The processor 12 also corresponds to an example of a processor included in the "road surface marking detection device" according to the present disclosure. Instead of such an example, the processor included in the road surface marking detection device may be different from the processor that controls the notification device. Further, in the example shown in FIG. 1, the processor 12 and the notification device 30 correspond to an example of a "notification system" according to the present disclosure.

2. Preventive Safety Assistance

Figure 2:
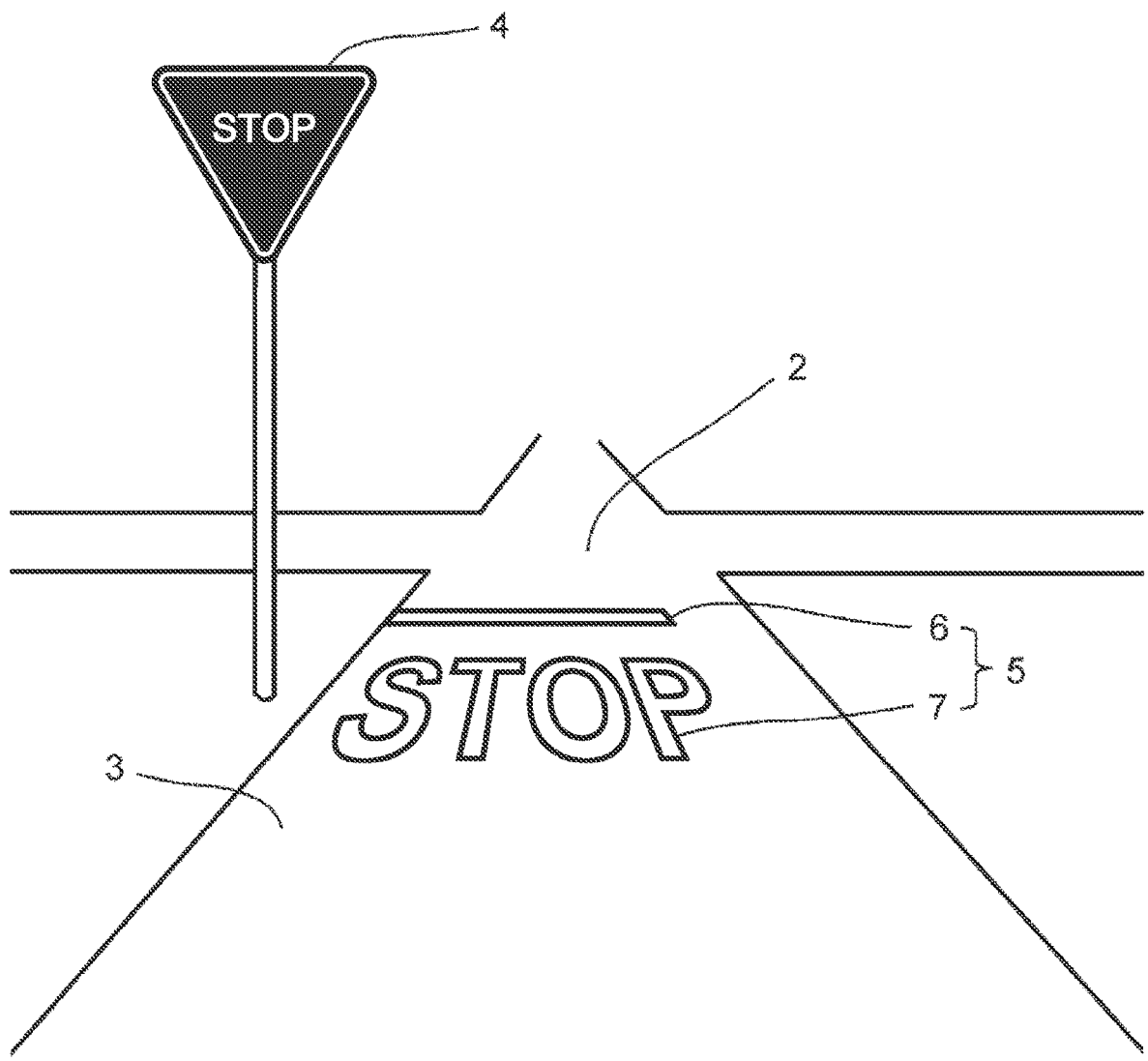
FIG. 2 is a diagram showing an example of an intersection where a vehicle is approaching.

FIG. 2 is a diagram showing an example of an intersection 2 where the vehicle 1 is approaching. A temporary stop sign 4 is installed on the side of a travel path 3 near the intersection 2. A stop line 6 and a "stop" marking 7 are drawn on the travel path 3 as road surface markings 5 corresponding to the temporary stop sign 4.

As one preventive safety assistance measure for the vehicle 1, the processor 12 performs notification to alert the driver regarding temporary stop of the vehicle 1 at the intersection 2 as necessary. Specifically, in order to alert the driver, the processor 12 first executes a process of detecting the temporary stop sign 4 by image recognition using the first camera 20. Next, the processor 12 attempts to detect road surface markings 5 by image recognition using the first camera 20.

However, the first camera 20 has an angle of view suitable for recognizing the above-described various targets including the road signs such as the temporary stop sign 4, the vehicles forward of the vehicle 1, and the pedestrians, and is mounted in a position suitable for recognizing the above-described various targets. Therefore, when the road surface markings 5 are within the road surface region R1 (see FIG. 1) of the first camera 20 and the road surface markings 5 are blocked by the preceding vehicle, the road surface markings 5 may be out of the angle of view of the first camera 20 when the vehicle 1 further approaches the road surface markings 5.

Therefore, in the present embodiment, when the temporary stop sign 4 forward of the vehicle 1 is detected by the first camera 20, the processor 12 executes a process of detecting the road surface markings 5 corresponding to the detected temporary stop sign 4 by the second camera 22.

Figure 3:
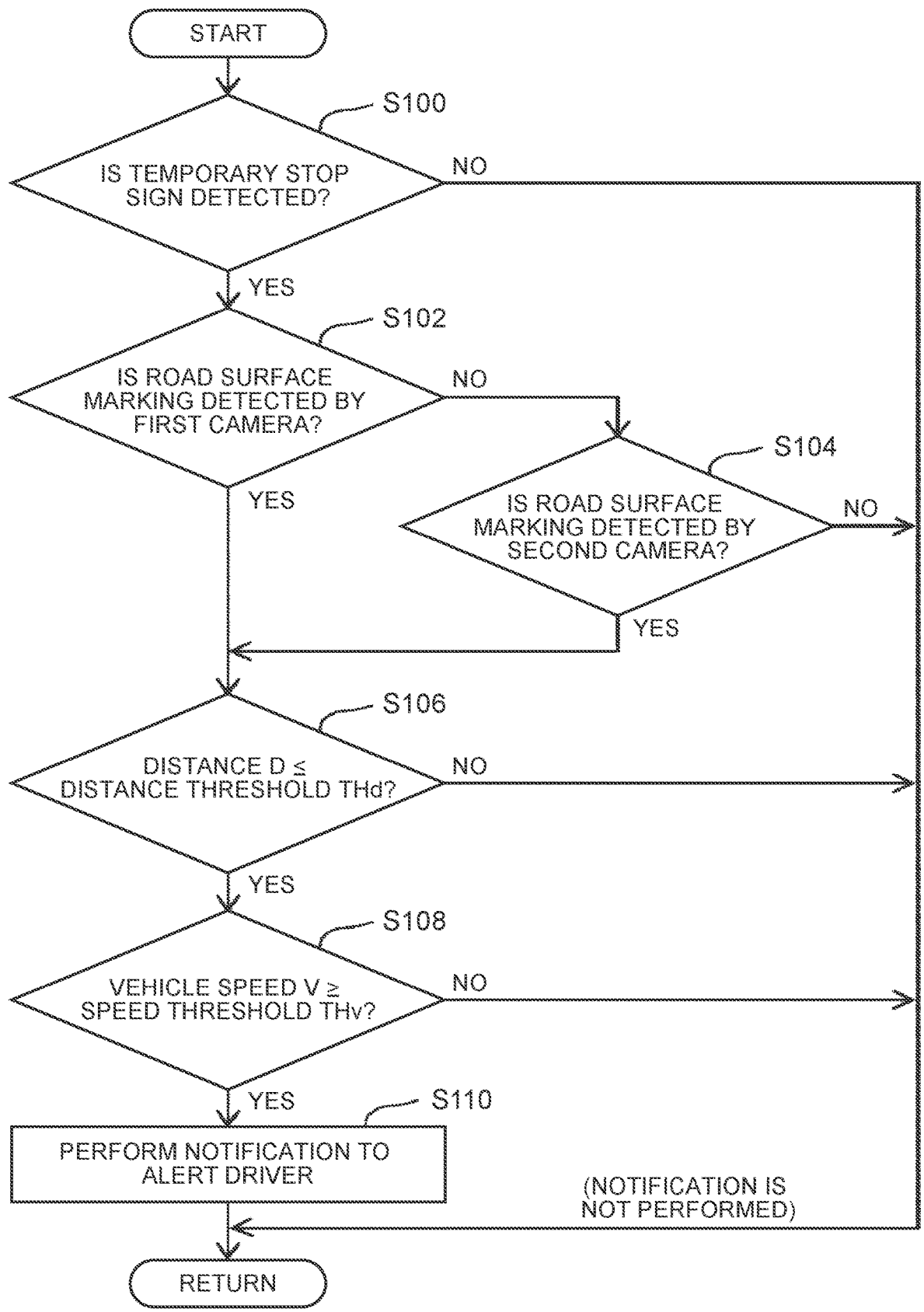
FIG. 3 is a flowchart showing a process related to preventive safety assistance according to the embodiment.

FIG. 3 is a flowchart showing a process related to the preventive safety assistance according to the embodiment. The process of this flowchart is repeatedly executed while the vehicle 1 is traveling.

In FIG. 3, the ECU 10 (processor 12) determines in step S100 whether the temporary stop sign 4 is detected by image recognition using the first camera 20. As a result, when the temporary stop sign 4 is not detected, the process proceeds to return.

On the other hand, when the temporary stop sign 4 is detected in step S100, the process proceeds to step S102. In step S102, the processor 12 determines whether the road surface marking 5 is detected by image recognition using the first camera 20. More specifically, the road surface markings 5 to be detected by the process of step S102 are both the stop line 6 and the "stop" marking 7, for example. The road surface marking 5 to be detected may be only one of the stop line 6 and the "stop" marking 7. This also applies to the road surface marking 5 to be detected by the second camera 22 in next step S104.

When the determination result in step S102 is Yes (that is, when the road surface marking 5 is detected by the first camera 20), the process proceeds to step S106. On the other hand, when the determination result is No (that is, when the road surface marking 5 is not detected by the first camera 20), the process proceeds to step S104.

In step S104, the processor 12 determines whether the road surface marking 5 is detected by image recognition using the second camera 22. As a result, when the determination result in step S104 is No (that is, when neither the first camera 20 nor the second camera 22 detects the road surface marking 5), the process proceeds to return. When the determination result in step S104 is Yes (that is, when the road surface marking 5 is detected by the second camera 22), the process proceeds to step S106.

In step S106, the processor 12 determines whether a distance D between the road surface marking 5 detected by the first camera 20 or the second camera 22 and the vehicle 1 is equal to or less than a predetermined distance threshold THd. When the road surface marking 5 is detected by the first camera 20, the distance D can be geometrically calculated, for example, from the ground height of the first camera 20 and the depression angle of the road surface marking 5 with respect to the first camera 20. This is the same when the road surface marking 5 is detected by the second camera 22 as well.

Each of the distance threshold THd and a speed threshold THv to be described below is a value determined in advance such that whether the driver has an intention to stop can be determined based on the distance D and the vehicle speed V. The distance threshold THd is, for example, 5 m. The speed threshold THv is, for example, 15 kph.

When the determination result in step S106 is No (distance D>distance threshold THd), the process proceeds to return. That is, the notification by the notification device 30 is not performed. As a result, it is possible to suppress the driver from feeling annoyed by excessive notification. On the other hand, when the determination result is Yes (distance D≤distance threshold THd), the process proceeds to step S108.

In step S108, the processor 12 determines whether the vehicle speed V is equal to or greater than the predetermined speed threshold THv. When the determination result is No, it is determined that the driver has an intention to stop since the vehicle speed V is reduced to the speed threshold THv or less in a situation in which the vehicle 1 is approaching the road surface marking 5 until the distance D becomes the distance threshold THd or less. Therefore, the process proceeds to return. That is, notification by the notification device 30 is not performed. As a result, it is possible to suppress the driver from feeling annoyed by excessive notification.

On the other hand, when the determination result in step S108 is Yes (vehicle speed V≥speed threshold THv), the process proceeds to step S110. The process proceeds to step S110 when the vehicle speed V is equal to or higher than the speed threshold THv even though the distance D is equal to or less than the distance threshold THd. In such a case, it is determined that the driver has no intention to stop. Therefore, in step S110, the processor 12 controls the notification device 30 such that the notification device 30 performs notification to alert the driver regarding the temporary stop of the vehicle. As a result, the notification can be performed in an appropriate scene.

The distance threshold THd and the speed threshold THv used in steps S106 and S108, respectively, may be changed, for example, based on an operation of a human machine interface (HMI) device (for example, a touch panel) by the driver. Specifically, for example, the distance threshold THd and the speed threshold THv may be changed in order to change the sensitivity of the notification by the notification device 30 at any level number (for example, low, medium, and high) according to the operation of the HMI device by the driver.

3. Effects

As described above, according to the present embodiment, the second camera 22 is used for detecting the road surface marking 5 as necessary as well as the first camera 20. The second camera 22 can capture the image of the road surface region R2A closer to the vehicle 1 than the road surface region R1 of which the image captured by the first camera 20 (see FIG. 1). Therefore, even when the first camera 20 cannot detect the road surface marking 5 due to the presence of the preceding vehicle when the vehicle 1 (own vehicle) approaches the road surface marking 5 such as the stop line 6, the second camera 22 can detect the road surface marking 5. In addition, even when the vehicle 1 is approaching the road surface marking 5, it is possible to place the road surface marking 5 within the angle of view of the second camera 22. Thus, with the "road surface marking detection device" according to the present embodiment, the road surface marking 5 such as the stop line 6 can be reliably detected.

Further, according to the present embodiment, as described above, since the second camera 22 is used in addition to the first camera 20 to increase the chances of detecting the road surface marking 5, it is possible to increase the chances of determining the driver's intention to stop. Therefore, it is possible to more effectively alert the driver using the notification device 30.

4. Modification of Notification by Notification Device

The notification by the notification device 30 may be performed as follows.

Figure 4:
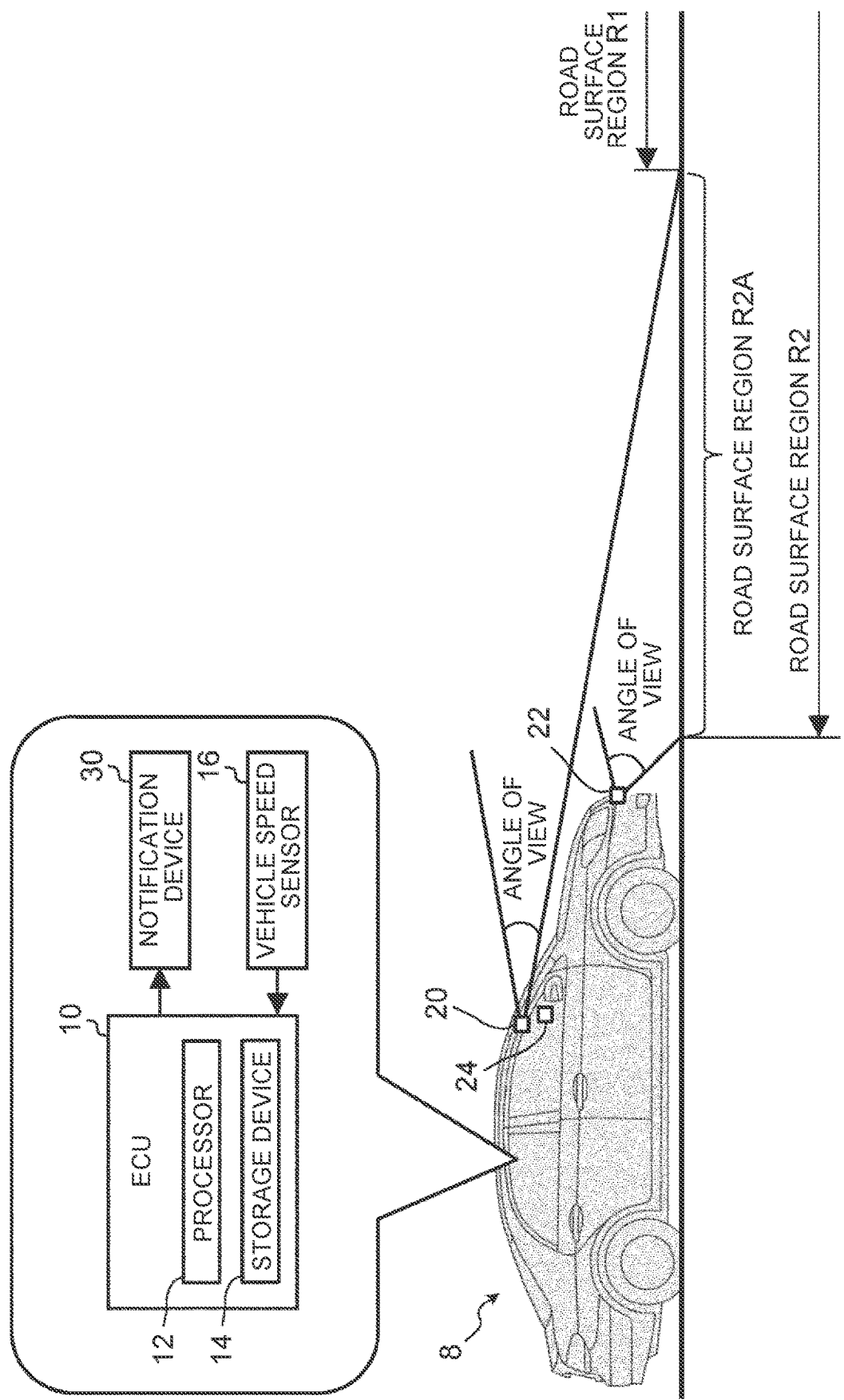
FIG. 4 is a diagram schematically showing an example of a configuration of a vehicle according to a modification of the embodiment.

FIG. 4 is a diagram schematically showing an example of a configuration of a vehicle 8 according to a modification of the embodiment. The vehicle 8 is configured in the same manner as the vehicle 1 shown in FIG. 1 except that an inward facing camera 24 is additionally provided. The inward facing camera 24 is mounted inside the vehicle 8 and captures an image of the driver.

Figure 5:
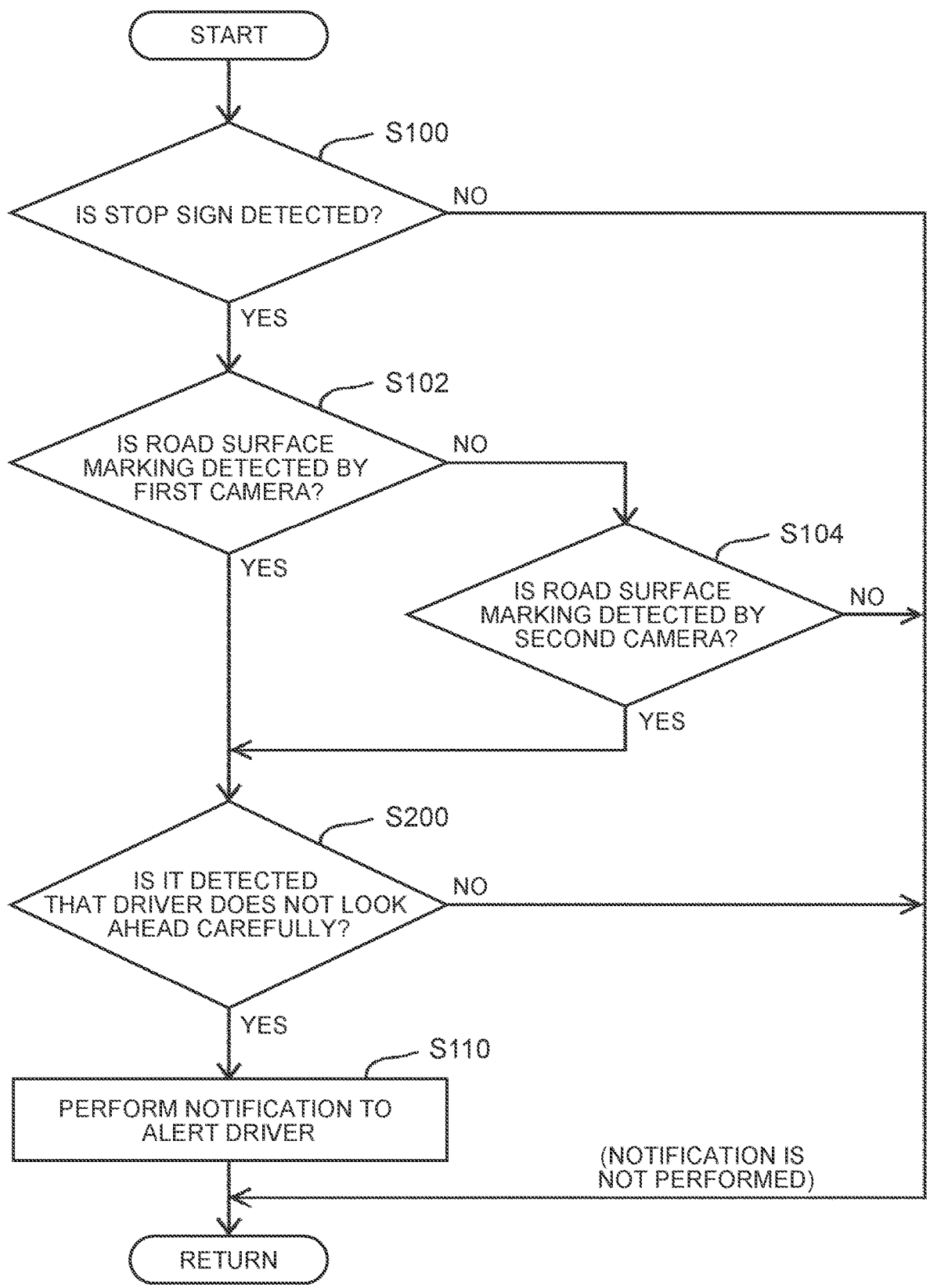
FIG. 5 is a flowchart showing a process related to preventive safety assistance according to the modification of the embodiment.

FIG. 5 is a flowchart showing a process related to preventive safety assistance according to the modification of the embodiment. The process of this flowchart is the same as the process of the flowchart shown in FIG. 3 except that the process of step S200 is executed instead of the processes of steps S106 and S108.

In FIG. 5, when the determination result of step S102 or step S104 is Yes, the process proceeds to step S200. In step S200, the processor 12 acquires driver information such as the line of sight, the degree of eye opening, the face orientation, and the posture based on the image of the inward facing camera 24. Based on the driver information, the processor 12 determines whether the driver does not look ahead carefully, for example, the drive looks away.

When the determination result in step S200 is No (that is, when the processor 12 does not detect that the driver does not look ahead carefully), the process proceeds to return. That is, the notification by the notification device 30 is not performed. As a result, it is possible to suppress the driver from feeling annoyed by excessive notification.

On the other hand, when the determination result in step S200 is Yes (that is, when the processor 12 detects that the driver does not look ahead carefully), the process proceeds to step S110, and the notification device 30 performs notification. As a result, the notification can be performed in an appropriate scene. The present disclosure can be applied to an autonomous driving vehicle.

What is claimed is:

1. A road surface marking detection device applied to a vehicle comprising:
   a first camera that captures an image of at least an area forward of the vehicle; and
   a second camera that captures an image of at least an area forward of the vehicle and that is able to capture an image of a road surface region closer to the vehicle than a road surface region of which the image captured by the first camera,
   wherein the road surface marking detection device includes a processor that, when a temporary stop sign forward of the vehicle is detected by the first camera and a road surface marking corresponding to the detected temporary stop sign is not detected by the first camera, executes a process of detecting the road surface marking by the second camera.

2. A notification system comprising:
   the road surface marking detection device according to claim 1;
   a notification device that performs notification to alert a driver of the vehicle; and
   a processor that controls, when a distance between the detected road surface marking and the vehicle is equal to or less than a distance threshold and a vehicle speed of the vehicle is equal to or higher than a speed threshold, the notification device such that the notification device performs notification to alert the driver regarding temporary stop of the vehicle.

3. A notification system comprising:
   the road surface marking detection device according to claim 1;
   a notification device that performs notification to alert a driver of the vehicle; and
   an inward facing camera that is mounted inside the vehicle and that captures an image of the driver; and
   a processor that controls the notification device such that the notification device performs notification to alert the driver regarding temporary stop of the vehicle, when the processor detects that the driver does not look ahead carefully based on an image of the inward facing camera after the road surface marking is detected.

4. The notification system of claim 3, wherein the processor controls the notification device such that the notification device performs notification to alert the driver regarding temporary stop of the vehicle, when the processor acquires degree of eye opening of the driver based on the image of the inward facing camera and detects that the driver does not look ahead carefully based on the acquired degree of eye opening of the driver, after the road surface marking is detected.

* * * * *